Patented Mar. 17, 1942

2,276,637

UNITED STATES PATENT OFFICE 2,276,637

5,6,7,8-TETRAHYDROANTHRAQUINONE DERIVATIVES CONTAINING NITROGEN AND A PROCESS OF PREPARING THEM

Karl Zahn and Heinrich Koch, Frankfort-on-the-Main, Germany, assignors to General Aniline & Film Corporation, a corporation of Delaware No Drawing. Application December 21, 1938, Serial No. 247,046. In Germany December 24, 1937

10 Claims. (Cl. 260—371)

The present invention relates to 5,6,7,8-tetrahydroanthraquinone derivatives containing nitrogen and to a process of preparing them.

We have found that 5,6,7,8-tetrahydroanthraquinone derivatives containing nitrogen, for instance those of the general formula:

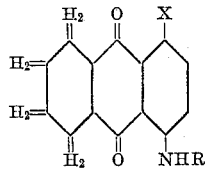

wherein X represents a member of the group consisting of hydroxy and the group NHR and wherein NHR represents the radical of a primary amine of the group consisting of alkylamines, hydroxy alkylamines, aralkylamines, cycloalkylamines, amines of the benzene series, the diphenyl series, and the naphthalene series the partial hydrogenation products of such amines, and the sulfonation products of such of said amines and their partial hydrogenation products as contain an aryl nucleous may be obtained by causing leuco 5,6,7,8-tetrahydroquinizarin to react with a primary amine or a mixture of different primary amines. As primary amines there may, for instance, be used: alkylamines, hydroxyalkylamines, aralkylamines, for instance benzylamine, cycloalkylamines, furthermore amines of the benzene series, of the diphenyl series or of the naphthalene series or partial hydrogenation products of such amines. Primary amino compounds containing a sulfo group may also be employed. This reaction is preferably conducted by heating the reaction components in a diluent at temperatures not exceeding about 200° C. During this operation an exchange of the non-meso hydroxyl groups of the quinizarin compound for the amine radical occurs and at first leuco compounds containing nitrogen are formed which can be dehydrogenated to the corresponding dye-bases by means of air or other suitable oxidizing agents, for instance, ferric chloride. Generally two amine radicals enter into the leuco-tetrahydroanthraquinone molecule during the reaction: they may be of the same or of different kind; under mild conditions of reaction only one amine radical enters the molecule. The reaction may be performed in a solvent, such as alcohol; the primary amine may, however, be used for the reaction in excess and the excess of the amine may then serve as flux. In some cases, it is preferable to add to the melt a condensing agent, such as boric acid. The smooth course of the reaction could not be foreseen. On the contrary it was to be expected that by the oxidation of the leuco bases obtained an entire dehydrogenation to the corresponding anthraquinone derivatives would occur.

The compounds obtained are new and may be regarded as N-substituted derivatives of the hitherto unknown 1-amino-4-hydroxy-or 1,4-diamino-5,6,7,8-tetrahydroanthraquinones. The products are deeply coloured, generally blue to green, and in some cases they may directly be used as dyestuffs.

The products obtainable by the invention which carry an aryl nucleus at the nitrogen atom, may be transformed by sulfonation into water-soluble sulfonic acids which may be used as acid wool dyestuffs. Thus, the dyestuff which has been obtained by the invention by means of para-toluidine and has been sulfonated yields on wool green dyeings which are more yellowish than those of the corresponding quinizarin green and, in comparison with them, possess good properties of fastness. This could not be foreseen at all with respect to the hydrogenated anthraquinone nucleus. If desired, the dyestuff sulfonic acids may be obtained by using for the condensation primary amines containing a sulfonic acid group.

The new compounds may serve as parent materials for the preparation of other dyestuffs.

The leuco-5,6,7,8-tetrahydroquinizarin used as starting material may be obtained by treating a quinizarin ether, for instance an alkyl ether, with hydrogen under pressure at a raised temperature and in the presence of a metal catalyst. In this manner there are obtained in an unexpectedly smooth manner the hitherto unknown hexahydroquinizarin ethers. By saponifying the hexahydroquinizarin ethers, for instance, with strong sulfuric acid or phosphoric acid, there is obtained with a nearly quantitative yield the hitherto unknown leuco-5,6,7,8-tetrahydroquinizarin.

The following examples serve to illustrate the invention, but they are not intended to limit it thereto; the parts are by weight:

(1) 12 parts of leuco-5,6,7,8-tetrahydroquinizarin are heated at 100° to 110° C., while stirring, for 3 hours together with 100 parts of para-toluidine and 8 parts of boric acid; air is passed over or through the melt for 1 hour and, after cooling to 80° C., the mass is diluted with about 150 to 200 parts of methanol. The condensation product separates on cooling in the form of crystals. It is filtered with suction and washed first with methanol and then with hot water. After drying, the 1,4-di-para-toluido-5,6,7,8-tetrahydroanthraquinone is recrystallized from butanol or chlorobenzene. There are obtained prisms having a bronze-like lustre, melting at 211° C. to 212° C. and dissolving in concentrated sulfuric acid to a red-violet solution. The dyestuff is sulfonated with fuming sulfuric acid containing 5 per cent. of sulfuric anhydride. The sulfonic acid dyes wool in an acid bath green shades. The dyeings are distinguished by good fastness to washing and to fulling.

(2) By using in Example 1 instead of paratoluidine 100 parts of 4-aminodiphenyl and working as described in that example, a dyestuff is obtained which may be recrystallized from chlorobenzene or butanol in the form of blue-black needles, melting at 214° C. to 216° C. and dissolving in concentrated sulfuric acid to a blue solution. After sulfonation with sulfuric acid monohydrate the dyestuff dyes wool in an acid bath yellowish green tints.

(3) By using in Example 1 instead of paratoluidine 100 parts of 4-cyclohexylaniline, there is obtained after dilution with methanol, a very good yield of a condensation product which crystallizes from chlorobenzene in the form of blue prisms melting at 219° C. to 221° C. and dissolving in concentrated sulfuric acid to a violet solution. The dyestuff sulfonated in the usual manner dyes wool green tints of good properties of fastness.

(4) A mixture of 25 parts of leuco-5,6,7,8-tetrahydroquinizarin, 160 parts of ethyl alcohol and 80 parts of an aqueous ethylamine solution of 50 per cent. strength is heated to boiling for 4 to 5 hours. Air is then passed through the solution for 2 hours. The 1,4-di-(ethylamino)-5,6,7,8-tetrahydroanthraquinone separates already from the hot solution in the form of coarse crystals having a bronze-like lustre, melting at 145° C. to 146° C. and dissolving in concentrated sulfuric acid to a bluish red solution and in organic solvents to pure blue solutions.

Instead of the ethylamine there may also be used the corresponding amount of methylamine; the 1,4-di-(methylamino)-5,6,7,8-tetrahydroanthraquinone is thus obtained in the form of long blue needles melting at 223° C. to 225° C. and dissolving in concentrated sulfuric acid to a light red solution, in organic solvents to clear greenish blue solutions. On acetate artificial silk blue dyeings are obtained.

(5) A mixture of 10 parts of leuco-5,6,7,8-tetrahydroquinizarin, 60 parts of ethyl alcohol and 10 parts of hydroxyethylamine is heated to boiling under reflux for several hours until unchanged parent material can no longer be detected. A strong current of air is then passed for 2 hours through this solution which gradually assumes a pure blue colouration. On cooling, the 1,4-di-(hydroxyethylamino)-5,6,7,8-tetrahydroanthraquinone separates in the form of fine crystals, melting at 196° C. to 198° C., dissolving in concentrated sulfuric acid to a blue red solution and in organic solvents to greenish blue solutions. Acetate silk is dyed blue-green shades.

(6) A mixture of 10 parts of leuco-5,6,7,8-tetrahydroquinizarin, 40 parts of butanol and 5 parts of cyclohexylamine is heated at 60° C., while stirring and excluding air, until the parent material can no longer be detected. The leucocompound of 1-hydroxy-4-cyclohexylamino-5,6,7,8-tetrahydroanthraquinone separates in the form of yellow green needles. The crystalline magma is diluted with 100 parts of methanol, then filtered with suction and the crystals well washed with methanol. The leuco-compound thus obtained may be oxidized in butanol in the presence of piperidine with air or in glacial acetic acid with ferric chloride to the 1-hydroxy-4-cyclohexylamino-5,6,7,8-tetrahydroanthraquinone. Blue prisms melting at 192° C. to 194° C. are obtained. They dissolve in concentrated sulfuric acid to a bluish red solution and in organic solvents to reddish blue solutions.

(7) A mixture of 10 parts of leuco-5,6,7,8-tetrahydroquinizarin, 40 parts of butanol and 20 parts of cyclohexylamine is heated to boiling for several hours in a reflux apparatus. 1 part of piperidine is added and air is led in until the solution has become clear blue. On cooling, the 1,4-di-(cyclohexylamino)-5,6,7,8-tetrahydroanthraquinone crystallizes in the form of long blue needles, melting at 213° C. to 215° C. and dissolving in concentrated sulfuric acid to a red solution and in organic solvents to greenish blue solutions.

(8) 100 parts of mesidine, 12 parts of leuco-5,6,7,8-tetrahydroquinizarin and 8 parts of boric acid are heated together, while stirring, for 3 hours as 170° C. to 180° C., air is then passed over the mixture for 1 hour, the whole is cooled to 80° C. and diluted with methanol. The crystals which have separated on cooling are filtered with suction and recrystallized from glacial acetic acid. The compound melts at 238° C. to 240° C. and dissolves in concentrated sulfuric acid to a reddish blue solution. When the dyestuff is stirred with sulfuric acid of 100 per cent. strength, for about 2 hours at room temperature, a disulfonic acid is obtained which probably has the following formula:

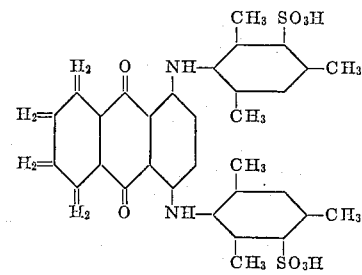

This acid or an alkali metal salt thereof dyes wool in an acid bath blue tints. The dyeings are distinguished by good properties of fastness.

(9) 10 parts of leuco-5,6,7,8-tetrahydroquinizarin are heated to boiling under reflux for about 5 hours with 100 parts of butanol and 25 parts of 2-amino-1,2,3,4-tetrahydronaphthalene. After addition of 1 part of piperidine a strong current of air is passed over the solution until it has become clear blue. The 1,4-di-(1',2',3',4'-tetrahydro-2'-naphthylamino)-5,6,7,8-tetrahydroanthraquinone separates in the form of felted blue needles melting at 220° C. to 221° C. It dissolves in concentrated sulfuric acid to a red solution and is sulfonated already after a short time. The disulfonic acid obtained according to the process described in Example 8 probably has the following formula:

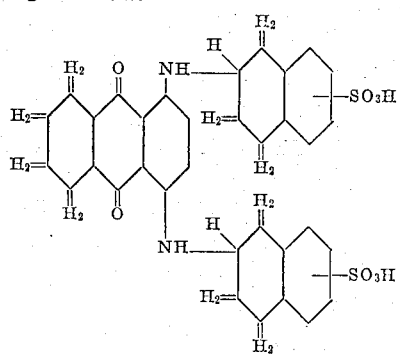

This acid or an alkali metal salt thereof dyes wool in an acid bath clear greenish blue tints.

The dyeings are distinguished by good properties of fastness.

(10) A mixture of 10 parts of leuco-5,6,7,8-tetrahydroquinizarin, 40 parts of ethyl alcohol, 4.2 parts of an aqueous ethylamine solution of 50 per cent. strength and 2.8 parts of hydroxyethylamine is heated to boiling for 5 hours in a reflux apparatus; 1 part of piperidine is then added to the brown solution and air is led in until the solution has become blue. On cooling, the 1-ethylamino - 4 - beta-hydroxyethylamino-5,6,7,8-tetrahydroanthraquinone crystallizes in the form of long blue small rods. After recrystallization from butanol it melts at 165° C. to 166° C.

Acetate artificial silk is dyed clear blue tints.

(11) By using in Example 1 instead of paratoluidine 100 parts of para-n-butoxyaniline a dyestuff is obtained which crystallizes from butanol in the form of blue leaflets, melting at 129° C. to 131° C. It dissolves in concentrated sulfuric acid to a blue violet solution. By treating the dyestuff with fuming sulfuric acid containing about 2 per cent. of sulfuric anhydride at 0° C. it is sulfonated.

(12) By using in Example 1 instead of paratoluidine 100 parts of para-(n-butyl)-aniline and proceeding as indicated in Example 1, the 1,4 - di-(para-n-butylanilino)-5,6,7,8-tetrahydroanthraquinone is obtained, after recrystallization from glacial acetic acid, in the form of blue spears melting at 99° C. to 101° C. It dissolves in concentrated sulfuric acid to a violet solution. The dyestuff is sulfonated with fuming sulfuric acid containing 5 per cent. of sulfuric anhydride. The sulfonic acid dyes wool in an acid bath green tints which are distinguished by good properties of fastness.

(13) A mixture of 25 parts of leuco-5,6,7,8-tetrahydroquinizarin, 100 parts of ethyl alcohol, 7 parts of an aqueous methylamine solution of 50 per cent. strength and 7 parts of hydroxethylamine is heated to boiling for 5 hours in a reflux apparatus. 1 part of piperidine is added to the brown solution and air is introduced until the dehydrogenation is finished. On cooling, the 1 - methylamino - 4 - hydroxethylamino - 5,6,7,8 - tetrahydroanthraquinone separates from the blue solution in the form of fine crystals. After recrystallization from butanol it melts at 198° C. to 200° C. It dissolves in concentrated sulfuric acid to a red solution and in organic solvents to blue solutions. Acetate artificial silk is dyed greenish blue tints.

(14) 100 parts of para-tertiary-butylaniline, 12 parts of leuco-5,6,7,8-tetrahydroquinizarin and 8 parts of boric acid are heated together for 4 hours, while stirring, at 100° C. to 110° C. Thereupon air is passed over the melt for 1 hour and the melt is subsequently diluted with methanol. On cooling, the 1,4-di-(para-tertiarybutylanilino) - 5,6,7,8 - tetrahydroanthraquinone separates. It crystallizes from butanol in the form of blue-black needles melting at 196° C. to 197° C. It dissolves in concentrated sulfuric acid to a violet solution. After sulfonation with fuming sulfuric acid containing about 5 per cent. of sulfuric anhydride it is converted into a dyestuff which dyes wool in an acid bath green tints.

The leuco-5,6,7,8-tetrahydroquinizarin used in the invention may be prepared, for instance, by one of the following methods:

(a) 268 parts of quinizarin dimethyl ether are suspended in 2½ times their weight of chlorobenzene and hydrogenated in an iron autoclave provided with a stirrer at 80° C. to 120° C. under 60 to 40 atmospheres pressure of hydrogen in the presence of 6 parts of nickel as a catalyst, until the quantity of hydrogen—about 6 parts—necessary for the formation of the hexahydrocompound has been absorbed. The product is filtered with suction while hot, from the catalyst and the filtrate is concentrated. The hexahydroquinizarin ether, crystallizing in the form of coarse yellow brown leaflets, separates, in part already during the concentration and further on cooling with a yield of 230 parts. The product melts at 153° C. to 155° C. When recrystallized from glacial acetic acid it melts at 156° C.

The nickel catalyst used for the hydrogenation may, for instance, be prepared by reduction of basic nickel carbonate, which is precipitated on a carrier, for instance, pumice stone, with hydrogen at a temperature of 400° C. to 600° C. For the preparation of the catalyst also mixtures of nickel carbonate and cobalt carbonate may be used.

274 parts of hexahydroquinizarin dimethyl ether are introduced in portions, while cooling, into ten times their weight of concentrated sulfuric acid at 5° C. to 10° C. and the whole is stirred for 1 hour. The coloration of the solution which is at first green turns gradually brown-red. 3000 parts of ice are added, the temperature being advantageously maintained below 50° C. The leuco-5,6,7,8-tetrahydroquinizarin thus produced separates in the form of nearly colorless needles with a nearly quantitative yield. It melts at 168° C. to 169° C. The compound dissolves in dilute caustic soda solution to a yellow solution which, by access of air, becomes blue-violet. On acidification, the 5,6,7,8-tetrahydroquinizarin separates from the solution thus obtained in the form of red needles melting at 156° C. to 157° C.

(b) By using in Example a instead of quinizarin dimethyl ether 296 parts of quinizarin diethyl ether and working in the manner indicated in Example a the hexahydroquinizarin diethyl ether is obtained in the form of yellow to brown needles melting at 139° C. to 140° C. By recrystallization from benzene or glacial acetic acid, the melting point is raised to 142° C. to 143° C. The diethyl ether may be saponified in manner similar to that described in Example a.

We claim:

1. The process which comprises condensing leuco-5,6,7,8-tetrahydroquinizarin with a primary amine of the group consisting of alkylamines, hydroxy-alkylamines, aralkylamines, cycloalkylamines, amines of the benzene series, the diphenyl series, and the naphthalene series and the partial hydrogenation products of such amines and mixtures of two of such different primary amines in the presence of an inert diluent and oxidizing the leuco compound obtained to the dyestuff.

2. The process which comprises condensing leuco-5,6,7,8-tetrahydroquinizarin with a primary amine of the group consisting of alkylamines, hydroxy-alkylamines, aralkylamines, cycloalkylamines, amines of the benzene series, the diphenyl series, and the naphthalene series and the partial hydrogenation products of such amines and mixtures of two of such different primary amines in the presence of an inert diluent, oxidizing the leuco compound obtained to the dyestuff and sulfonating it.

3. The process which comprises heating at a temperature of about 170° C. to 180° C. for about 3 hours leuco-5,6,7,8-tetrahydroquinizarin with an excess of mesidine in the presence of boric acid, oxidizing the leuco compound obtained and sulfonating it with sulfuric acid monohydrate at room temperature.

4. The process which comprises heating for about 5 hours in boiling butanol leuco-5,6,7,8-tetrahydroquinizarin with 2-amino-1,2,3,4-tetrahydronaphthalene, oxidizing the leuco compound obtained and sulfonating it with sulfuric acid mono-hydrate at room temperature.

5. The process which comprises heating for about 5 hours in boiling ethyl alcohol leuco-5,6,7,8-tetrahydroquinizarin with a mixture of ethylamine and hydroxy-ethylamine and oxidizing the leuco compound obtained to the dyestuff.

6. The compounds of the general formula:

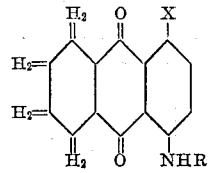

wherein X represents a member of the group consisting of hydroxy and the group NHR and wherein NHR represents the radical of a primary amine of the group consisting of alkylamines, hydroxy alkylamines, aralkylamines, cycloalkylamines, amines of the benzene series, the diphenyl series, and the naphthalene series, the partial hydrogenation products of such amines, and the sulfonation products of such of said amines and their partial hydrogenation products as contain an aryl nucleus.

7. The compounds of the general formula:

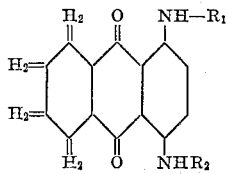

wherein —NHR₁ and —NHR₂ represent radicals of a primary amine of the group consisting of alkylamines, hydroxy alkylamines, aralkylamines, cycloalkylamines, amines of the benzene series, the diphenyl series, and the naphthalene series, the partial hydrogenation products of such amines, and the sulfonation products of such of said amines and their partial hydrogenation products as contain an aryl nucleus.

8. The compound of the formula:

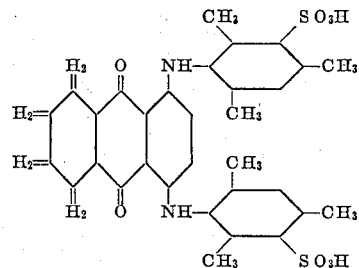

and its alkali metal salts dyeing wool in an acid bath blue tints of good fastness properties.

9. The compound of the formula:

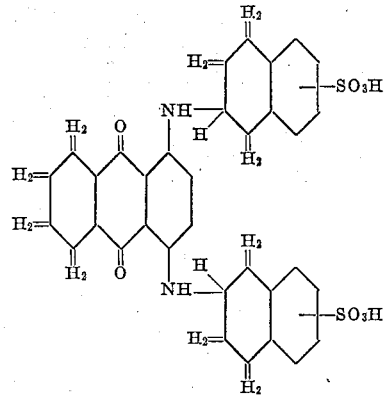

and its alkali metal salts dyeing wool in an acid bath clear greenish blue tints of good fastness properties.

10. The compound of the formula:

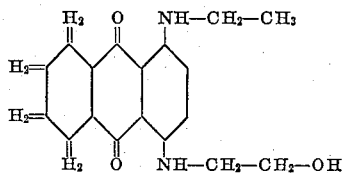

crystallizing in the form of long blue small rods and melting, when recrystallized from butanol, at 165° C. to 166° C.

KARL ZAHN.
HEINRICH KOCH.